US011347925B2

(12) United States Patent
Schultz

(10) Patent No.: US 11,347,925 B2
(45) Date of Patent: May 31, 2022

(54) POWER GRID ARCHITECTURE AND OPTIMIZATION WITH EUV LITHOGRAPHY

(71) Applicant: Advanced Micro Devices, Inc., Sunnyvale, CA (US)

(72) Inventor: Richard T. Schultz, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 50 days.

(21) Appl. No.: 15/636,278

(22) Filed: Jun. 28, 2017

(65) Prior Publication Data
US 2018/0314785 A1 Nov. 1, 2018

Related U.S. Application Data

(60) Provisional application No. 62/492,705, filed on May 1, 2017.

(51) Int. Cl.
*G06F 30/394* (2020.01)
*G06F 30/39* (2020.01)
(Continued)

(52) U.S. Cl.
CPC ............ *G06F 30/394* (2020.01); *G06F 30/39* (2020.01); *G06F 30/392* (2020.01);
(Continued)

(58) Field of Classification Search
CPC ...... G06F 30/39; G06F 30/392; G06F 30/394; H01L 23/5286; H01L 27/0207; H01L 27/11807; H01L 2027/11881
See application file for complete search history.

(56) References Cited

U.S. PATENT DOCUMENTS

| 4,851,892 A | 7/1989 | Anderson et al. |
| 5,591,999 A | 1/1997 | Momodomi et al. |

(Continued)

OTHER PUBLICATIONS

Wachnik et al., "Practical Benefits of the Electromigration Short-Length Effect, Including a New Design Rule Methodology and an Electromigration Resistant Power Grid with Enhanced Wireability". 2000 Symposium on VLSI Technology Digest of Technical Papers, pp. 220-221. Jun. 13-15, 2000. (Year: 2000).*

(Continued)

*Primary Examiner* — Jack Chiang
*Assistant Examiner* — Aric Lin
(74) *Attorney, Agent, or Firm* — Kowert Hood Munyon Rankin and Goetzel PC; Rory D. Rankin

(57) ABSTRACT

A system and method for laying out power grid connections for standard cells are described. In various embodiments, a standard cell uses unidirectional tracks for each of the multiple power vertical metal 3 layer tracks and power horizontal metal 2 tracks. One or more of the multiple vertical metal 3 layer posts are routed with a minimum length based on a pitch of power horizontal metal 2 layer straps. One or more vertical metal 1 posts used for a power connection or a ground connection are routed from a top to a bottom of an active region permitting multiple locations to be used for connections to one of the multiple power horizontal metal 2 layer straps. Two or more power horizontal metal 2 layer straps are placed within a power metal 2 layer track without being connected to one another.

20 Claims, 10 Drawing Sheets

(51) Int. Cl.
  *G06F 30/392* (2020.01)
  *H01L 27/02* (2006.01)
  *H01L 23/528* (2006.01)
  *H01L 27/118* (2006.01)

(52) U.S. Cl.
  CPC ...... *H01L 23/5286* (2013.01); *H01L 27/0207* (2013.01); *H01L 2027/11881* (2013.01)

(56) References Cited

U.S. PATENT DOCUMENTS

| | | | |
|---|---|---|---|
| 6,100,101 A | 8/2000 | Marathe et al. | |
| 6,242,767 B1 | 6/2001 | How et al. | |
| 6,609,242 B1* | 8/2003 | Slade | G06F 30/39 716/127 |
| 7,064,074 B2 | 6/2006 | Van Bentum et al. | |
| 7,737,482 B2 | 6/2010 | Cheng et al. | |
| 8,185,855 B2* | 5/2012 | Kanari | H01L 27/0207 716/110 |
| 8,258,550 B2 | 9/2012 | Becker et al. | |
| 8,264,007 B2 | 9/2012 | Becker et al. | |
| 8,356,268 B2 | 1/2013 | Becker et al. | |
| 8,513,978 B2 | 8/2013 | Sherlekar | |
| 8,561,003 B2 | 10/2013 | Kawa et al. | |
| 8,680,626 B2 | 3/2014 | Smayling et al. | |
| 9,400,862 B2 | 7/2016 | Kawa et al. | |
| 9,431,383 B2 | 8/2016 | Baek et al. | |
| 9,460,259 B2 | 10/2016 | Baek et al. | |
| 9,502,351 B1 | 11/2016 | Sahu | |
| 9,553,028 B2 | 1/2017 | Xie et al. | |
| 9,589,847 B1 | 3/2017 | Chi et al. | |
| 9,633,987 B2 | 4/2017 | Smayling et al. | |
| 9,659,939 B1 | 5/2017 | Cao et al. | |
| 9,691,768 B2 | 6/2017 | Moroz et al. | |
| 9,704,995 B1 | 7/2017 | Schultz | |
| 9,837,398 B1 | 12/2017 | Rowhani et al. | |
| 9,837,437 B2 | 12/2017 | Baek et al. | |
| 9,881,926 B1* | 1/2018 | Basker | H01L 21/02167 |
| 2001/0015464 A1* | 8/2001 | Tamaki | H01L 21/823871 257/393 |
| 2002/0069396 A1* | 6/2002 | Bhattacharya | G06F 30/30 716/102 |
| 2003/0023937 A1* | 1/2003 | McManus | G06F 17/5068 257/204 |
| 2005/0045916 A1* | 3/2005 | Kim | H01L 27/11807 257/202 |
| 2007/0063244 A1 | 3/2007 | Ho et al. | |
| 2007/0284619 A1* | 12/2007 | Kanno | G01R 31/318572 257/207 |
| 2008/0283925 A1 | 11/2008 | Berthold et al. | |
| 2010/0095263 A1* | 4/2010 | Frederick | G06F 30/394 716/129 |
| 2010/0127333 A1 | 5/2010 | Hou et al. | |
| 2010/0287518 A1 | 11/2010 | Becker | |
| 2012/0313148 A1 | 12/2012 | Schultz | |
| 2013/0026572 A1 | 1/2013 | Kawa et al. | |
| 2013/0119474 A1 | 5/2013 | Schultz | |
| 2013/0146986 A1 | 6/2013 | Rashed et al. | |
| 2013/0154128 A1* | 6/2013 | Wang | H01L 23/5286 257/786 |
| 2013/0295756 A1 | 11/2013 | Yuan et al. | |
| 2013/0313513 A1 | 11/2013 | Cappellani et al. | |
| 2013/0334613 A1 | 12/2013 | Moroz | |
| 2014/0197494 A1 | 7/2014 | Schultz | |
| 2014/0252650 A1 | 9/2014 | Utsumi | |
| 2015/0048425 A1 | 2/2015 | Park et al. | |
| 2015/0052494 A1 | 2/2015 | Tarabbia et al. | |
| 2015/0069531 A1 | 3/2015 | Naczas et al. | |
| 2015/0214113 A1* | 7/2015 | Bouche | H01L 21/76816 438/283 |
| 2015/0269302 A1 | 9/2015 | Katta et al. | |
| 2015/0270176 A1* | 9/2015 | Xie | H01L 21/76877 257/384 |
| 2015/0302917 A1 | 10/2015 | Grover et al. | |
| 2015/0333008 A1 | 11/2015 | Gupta et al. | |
| 2016/0163644 A1 | 6/2016 | Woo et al. | |
| 2016/0284705 A1 | 9/2016 | Chung | |
| 2017/0125292 A1 | 5/2017 | Greene et al. | |
| 2017/0263506 A1 | 9/2017 | Bouche et al. | |
| 2017/0294448 A1* | 10/2017 | Debacker | H01L 27/11807 |
| 2017/0323902 A1 | 11/2017 | Zeng et al. | |
| 2017/0365621 A1 | 12/2017 | Becker et al. | |
| 2017/0371995 A1 | 12/2017 | Correale, Jr. et al. | |
| 2017/0373090 A1 | 12/2017 | Correale, Jr. et al. | |
| 2018/0033701 A1 | 2/2018 | Bouche et al. | |
| 2018/0090440 A1 | 3/2018 | Schultz et al. | |
| 2018/0218981 A1 | 8/2018 | Lin et al. | |
| 2018/0308796 A1* | 10/2018 | Peng | H01L 23/5286 |
| 2018/0315709 A1 | 11/2018 | Schultz | |
| 2019/0355829 A1* | 11/2019 | Wang | H01L 21/76834 |

OTHER PUBLICATIONS

Xie et al., "5nm FinFET Standard Cell Library Optimization and Circuit Synthesis in Near- and Super-Threshold Voltage Regimes", 2014 IEEE Computer Society Annual Symposium on VLSI, Jul. 2014, pp. 424-429.
Cui et al., "7nm FinFET Standard Cell Layout Characterization and Power Density Prediction in Near- and Super-Threshold Voltage Regimes", International Green Computing Conference, Nov. 2014, 7 pages.
International Search Report and Written Opinion in International Application No. PCT/US2018/029767, dated Jul. 11, 2018, 14 pages.
International Search Report and Written Opinion in International Application No. PCT/US2018/029760, dated Jul. 16, 2018, 16 pages.
Non-Final Office Action in U.S. Appl. No. 15/636,245, dated May 18, 2018, 30 pages.
Final Office Action in U.S. Appl. No. 15/636,245, dated Jan. 14, 2019, 31 pages.
Non-Final Office Action in U.S. Appl. No. 15/636,245, dated May 29, 2019, 23 pages.
Non-Final Office Action in U.S. Appl. No. 15/636,245, dated Nov. 3, 2020, 17 pages.
Communication pursuant to Article 94(3) EPC in European Application No. 18724101.3, dated Jul. 26, 2021, 9 pages.
Communication pursuant to Article 94(3) EPC in European Application No. 18724699.6, dated Jul. 7, 2021, 9 pages.
Notice of Allowance in U.S. Appl. No. 15/636,245, dated Aug. 24, 2021, 9 pages.
First Examination Report in Indian Patent Application No. 201917047564, dated Jan. 13, 2022, 7 pages.
First Examination Report in Indian Patent Application No. 201917047566, dated Feb. 7, 2022, 6 pages.
Office Action in Korean Patent Application No. 10-2019-7034918, dated Feb. 27, 2022, 10 pages.

* cited by examiner

POWER GRID ARCHITECTURE AND OPTIMIZATION WITH EUV LITHOGRAPHY

CROSS REFERENCE TO RELATED APPLICATIONS

This application claims priority to Provisional Patent Application Ser. No. 62/492,705, entitled "Power Grid Architecture and Optimization For 5NM and Beyond with EUV Lithography", filed May 1, 2017, the entirety of which is incorporated herein by reference.

BACKGROUND

Description of the Relevant Art

As both semiconductor manufacturing processes advance and on-die geometric dimensions reduce, semiconductor chips provide more functionality and performance while consuming less space. While many advances have been made, design issues still arise with modern techniques in processing and integrated circuit design that limit potential benefits. For example, capacitive coupling, electromigration, leakage currents and processing yield are some issues which affect the placement of devices and the routing of signals across an entire die of a semiconductor chip. Thus, these issues have the potential to delay completion of the design and affect the time to market.

In order to shorten the design cycle for semiconductor chips, manual full-custom designs are replaced with automation where possible. A designer provides a description of a functional unit or a complex gate in a high-level description language such as Verilog, VHDL and so on. A synthesis tool receives the logic description and provides the logical netlist. The logical netlist is used by a place-and-route (PNR) tool to provide physical layout. The place-and-route tool uses a cell layout library to provide the physical layout.

The cell layout library includes multiple standard cell layouts for providing the various functionalities used by the semiconductor chip. In some cases, a standard cell layout is created manually. Therefore, each new standard cell layout or each original standard cell layout being modified is created manually. In other cases, the rules used by the place-and-route tool are adjusted to automate the cell creation. However, the automated process at times does not satisfy each of the rules directed at performance, power consumption, signal integrity, process yield, both local and external signal routing including internal cross coupled connections, height and width cell dimensions matching other cells, pin access, power rail design and so on. Therefore, designers manually create these cells to achieve better results for the multiple characteristics or rewrite the rules for the place-and-route tool.

Generally, the standard cell layouts use at least one power rail for the supply voltage connections also referred to as the VDD power rail and one power rail for the ground connections also referred to as the VSS power rail. In some cases, the power and ground rails use relatively long wires utilizing multiple metal layers such as horizontal metal zero, vertical metal one, horizontal metal two and vertical metal three in addition to the corresponding vias. In other cases, fixed location posts are used within the standard cell to make the power and ground connections. Each of these cases reduces flexibility for placement of the standard cell in the semiconductor chip and for alleviating signal routing congestion. Real-time routing optimization is limited or completely removed.

In view of the above, efficient methods and systems for laying out power grid connections for standard cells are desired.

BRIEF DESCRIPTION OF THE DRAWINGS

The advantages of the methods and mechanisms described herein may be better understood by referring to the following description in conjunction with the accompanying drawings, in which.

Figure 1:
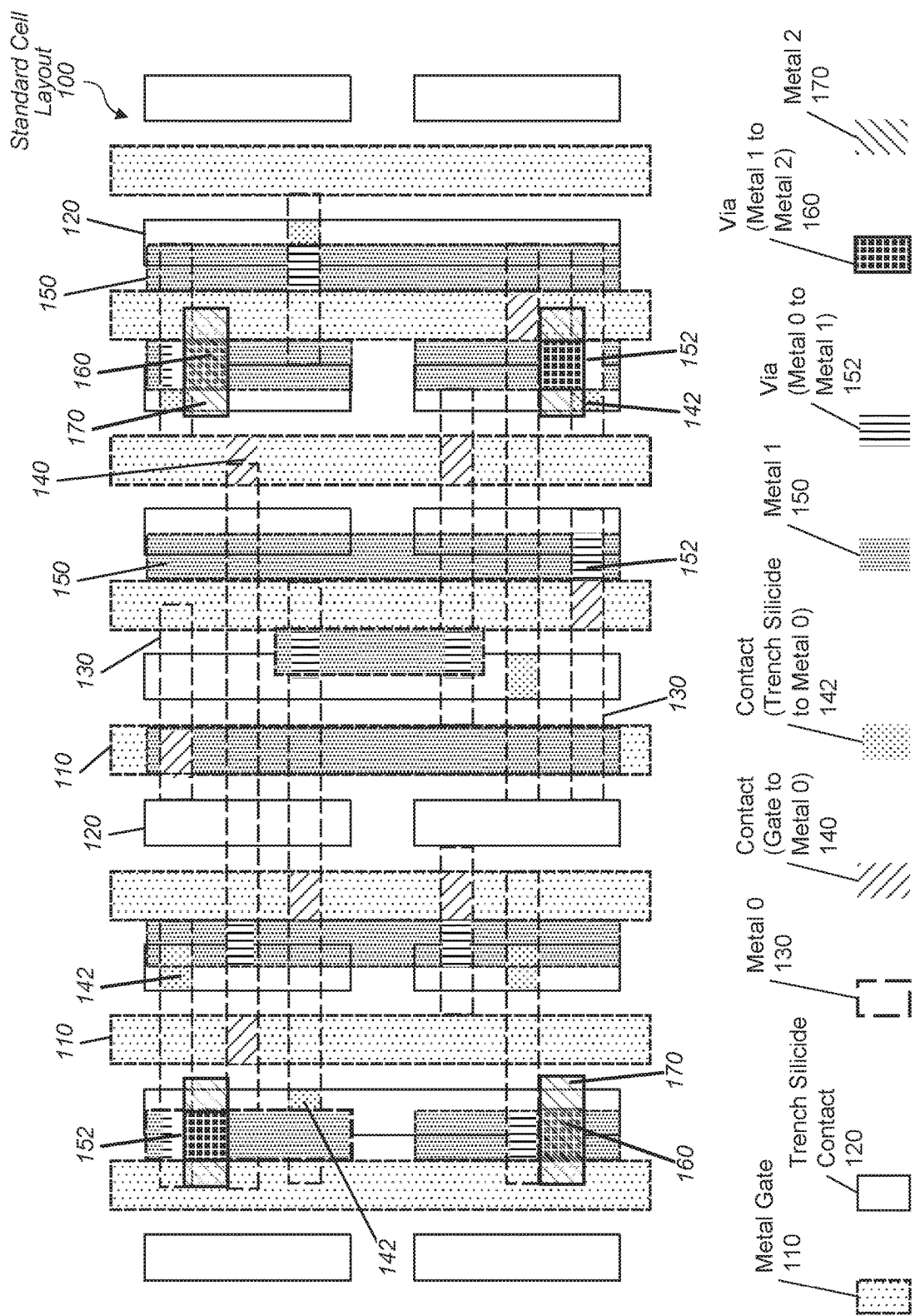
FIG. 1 is a generalized diagram of a top view of a standard cell layout for a complex logic gate.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems and methods for laying out power grid connections for standard cells are contempleted. In various embodiments, a standard cell uses multiple independent power posts in a first metal layer, each providing a power connection to a device (transistor) within the standard cell. A power post in a given metal layer is referred to as an independent power post when the power post is not connected to another of power post in the given metal layer. Since the power posts are independent in the first metal layer, no power rails are used in the first metal layer. In one embodiment, the first metal layer is a vertical metal one (M1) layer. The power connection to the device is one of a power supply connection and a ground reference connection.

In various embodiments, the standard cell also uses multiple independent power posts in a second metal layer different from the first metal layer. Each of the multiple power posts in the second metal layer is not connected to another of the multiple power posts in the second metal layer. Therefore, power rails are not used in the second metal layer. In an embodiment, the second metal layer is a vertical metal three (M3) layer. In some embodiments, each of the multiple independent power posts in the second metal layer has a length less than a height of the standard cell.

In some embodiments, one or more of the independent power posts in the second metal layer is a unidirectional signal route. Signal routes in the second metal layer with no bends and no L-shapes are referred to as unidirectional routes. In contrast, signal routes in the first metal layer with bends and/or L-shapes are referred to as bidirectional routes. Bidirectional routes create a significant on-die area penalty.

In various embodiments, the standard cell also uses multiple independent power straps in a third metal layer different from each of the first metal layer and the second metal layer. Each of the multiple power straps in the third metal layer is not connected to another of the multiple power straps in the third metal layer. Therefore, power rails are not used in the third metal layer. In an embodiment, the third metal layer is a horizontal metal two (M2) layer. Each of the multiple independent power straps connects one of the multiple independent power posts in the first metal layer to one of the multiple independent power posts in the second metal layer. In one embodiment, each of the independent horizontal M2 power straps connects one of the independent vertical M1 power posts to one of the independent vertical M3 power posts.

In one embodiment, one or more of the multiple independent power posts in the second metal layer has a length based on a pitch of the multiple independent power straps. In one example, the second metal layer is the vertical M3 layer and the independent power straps are routed using the horizontal M2 layer. In this example, one or more of the independent power posts in the vertical M3 layer has a length based on the pitch of the independent power straps in the horizontal M2 layer. In some embodiments, one or more of the multiple independent power posts in the first metal layer is routed from a top to a bottom of an active region of the device in the standard cell, which provides multiple locations for connections to one of the independent power straps. The multiple locations provide flexibility for place-and-route algorithms for the standard cell. In an embodiment, each of the independent power straps is routed no further than between one of the independent power posts in the first metal layer and one of the independent power posts in the second metal layer.

Since the power posts in the second metal layer, such as the vertical M3 layer in one example, are independent, and similarly, the power straps in the third metal layer, such as the horizontal M2 layer, are also independent, gaps are created between the independent power posts in the vertical direction and between the independent power straps in the horizontal direction. The gaps provide available space in the standard cell for non-power signal routes. These gaps alleviate any signal routing congestion in the standard cell.

Referring to FIG. 1, a generalized block diagram of a top view of a standard cell layout 100 is shown. Here, the active regions are not shown in the standard cell layout 100 for ease of illustration. The PMOS FETS (pfets) are at the top of the standard cell layout 100 and the NMOS FETS (nfets) are at the bottom of the standard cell layout 100. In the illustrated embodiment, the standard cell layout 100 is for a complex logic gate.

In some embodiments, the devices in the standard cell layout 100 are fabricated by one of the immersion lithography techniques, the double patterning technique, the extreme ultraviolet lithography (EUV) technique, and the directed self-assembly (DSA) lithography technique. In some embodiments, the EUV technique provides more flexibility relative to via and contact modules relative to other techniques.

In various embodiments, the devices (transistors) in the standard cell layout 100 are non-planar devices (transistors). Non-planar transistors are a recent development in semiconductor processing for reducing short channel effects. Tri-gate transistors, Fin field effect transistors (FETs) and gate all around (GAA) transistors are examples of non-planar transistors. As shown, the standard cell layout 100 uses metal gate 110 in a vertical direction, trench silicide contacts 120 for the source and drain regions in the vertical direction, metal 0 (M0 or Metal0) 130 for local interconnections in the horizontal direction, contacts 140 for connecting the metal gate 110 to Metal0 130 and contacts 142 for connecting the trench silicide contact 120 to Metal0 130.

The layout 100 uses a triplet group at the top for routing three horizontal signal routes with the horizontal Metal0 130 local interconnect. In addition, the layout 100 uses a triplet group at the bottom for routing three horizontal signal routes with the horizontal Metal0 130 local interconnect. A spacing exists between the two triplet groups, which can be used for additional signal routing tracks.

In some embodiments, the extreme ultraviolet lithography (EUV) technique is used to provide the resolution of each of the width and the pitch of the horizontal Metal0 130 routes in the triplet groups. The EUV technique uses an extreme ultraviolet wavelength to reach resolution below 40 nanometers. The extreme ultraviolet wavelength is approximately 13.5 nanometers. Relatively high temperature and high density plasma is used to provide the EUV beam. In other embodiments, the directed self-assembly (DSA) lithography technique used to provide the resolution of each of the width and the pitch. The DSA technique takes advantage of the self-assembling properties of materials to reach nanoscale dimensions.

In yet other embodiments, the resolution of each of the width and the pitch of the horizontal Metal0 130 routes in the triplet groups is set by the immersion lithography technique. Immersion lithography uses a liquid medium, such as purified water, between the lens of the imaging equipment and the wafer surface. Previously, the gap space was simply air. The resolution achieved by this technique is the resolution of the imaging equipment increased by the refractive index of the liquid medium. In some examples, the increased resolution falls above 80 nanometers.

In other embodiments, the double patterning technique is used to provide the resolution of each of the width and the pitch of the horizontal Metal0 130 routes in the triplet groups. The double patterning technique uses immersion lithography systems to define features with resolution between 40 and 80 nanometers. Either of the self-aligned doubled patterning (SADP) technique or the litho-etch-litho-etch (LELE) technique is used. The double patterning technique counteracts the effects of diffraction in optical lithography, which occurs when the minimum dimensions of features on a wafer are less than the 193 nanometer wavelength of the illuminating light source. Other examples of techniques used to counteract the effects of diffraction in optical lithography are phase-shift masks, optical-proximity correction (OPC) techniques, optical equipment improvements and computational lithography.

When selecting between immersion lithography, double patterning, EUV and DSA techniques, and other techniques, cost is considered as the cost increases from immersion lithography to EUV. However, over time, the costs of these techniques adjust as well as additional and newer techniques are developed for providing relatively high resolution for the width and the pitch of the horizontal Metal0 130 routes in the triplet groups. Accordingly, one of a variety of lithography techniques is used to provide relatively high resolution for the width and the pitch.

The relatively high resolution for the width and the pitch allows for 3 locations (which may sometimes be referred to as "hit points" or "spots") for contacts to be placed on the trench silicide contact 120 and the metal gate 110. These 3 locations provide efficient signal and power routing. For example, the pfets at the top of layout 100 have access to three potential locations for contacts, and similarly, the nfets at the bottom of layout 100 have access to three potential locations for contacts. The flexibility offered by the three potential locations for contacts eliminates using other metal interconnects, such as vertical Metal 1 or horizontal Metal 2, and the corresponding contacts for routing signals and power.

The standard cell layout 100 additionally uses metal 1 (M1 or Metal1) 150 for local interconnections in the vertical direction and vias 152 for connecting the horizontal interconnect Metal0 130 to the vertical interconnect Metal1 150. Layout 100 uses power pins at the top and the ground pins at the bottom. As shown, layout 100 does not use at all power rails in Metal0 130. The vertical Metal1 150 routing at the top provides flexible connection to horizontal metal 2 (M2 or Metal2) 170 for creating power connections. The vertical Metal1 150 routing at the bottom provides flexible connection to Metal2 170 tracks for creating ground connections. In addition, vias 160 are used for connecting vertical Metal1 150 to horizontal Metal2 170. As shown, such a connection is made in each of the four corners of layout 100.

Figure 2:
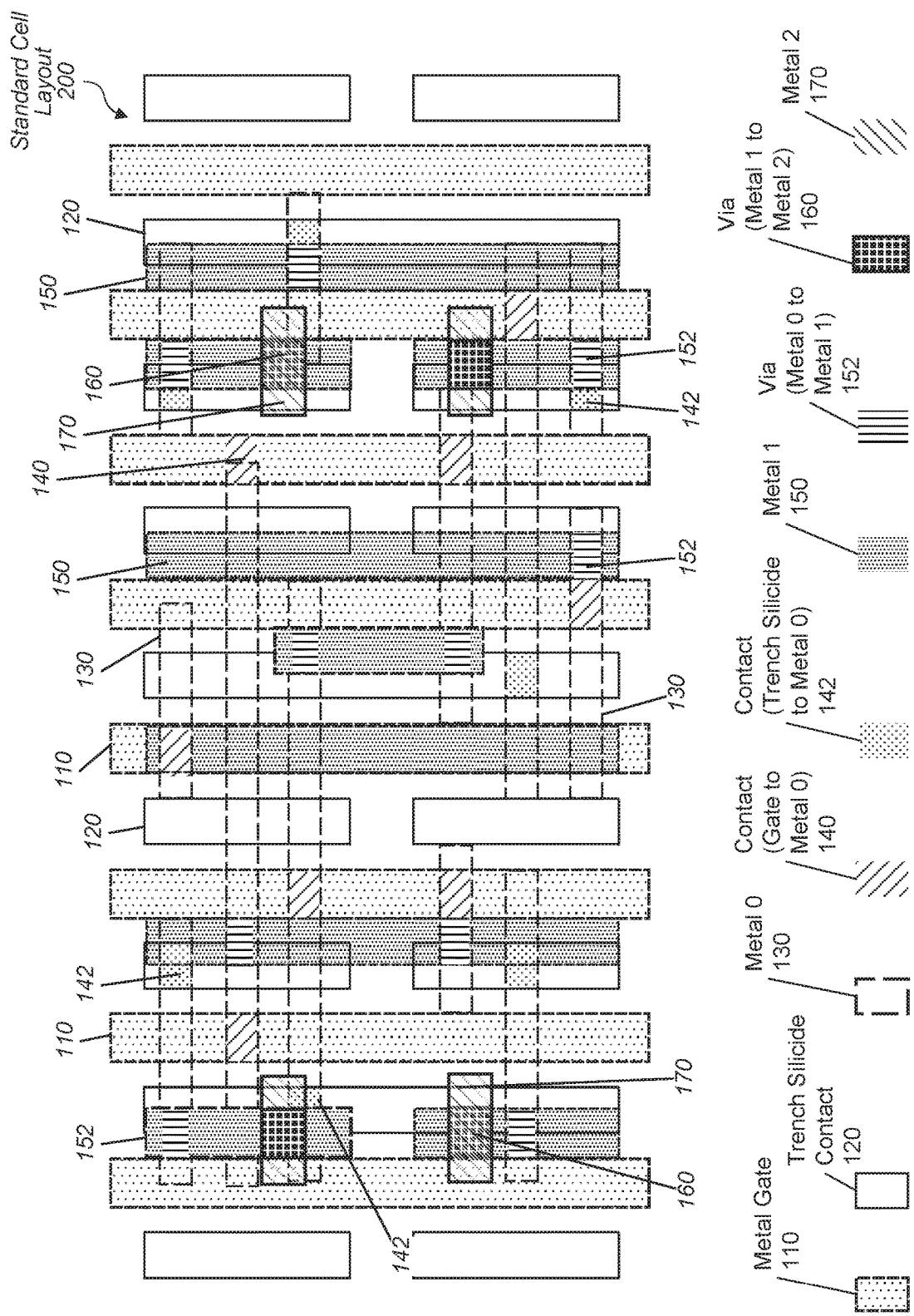
FIG. 2 is a generalized diagram of a top view of a standard cell layout for a complex logic gate.

Referring to FIG. 2, a generalized block diagram of a top view of a standard cell layout 200 is shown. Layout elements described earlier are numbered identically. Similar to the layout 100, the post locations for the power connections at the top and the ground connections at the bottom are not fixed at the chip level and can be moved inside the standard cells. Here in layout 200, the placement of the vias 160 and the optional horizontal Metal2 170 posts are different from the placements used in the layout 100. The four connections provided by the vias 160 are more central in the layout 200 versus the placements used in the layout 100 where the four connections are near the outer corners. The Metal1 150 routing is used to provide flexible placement of the connections for power and ground.

Figure 3:
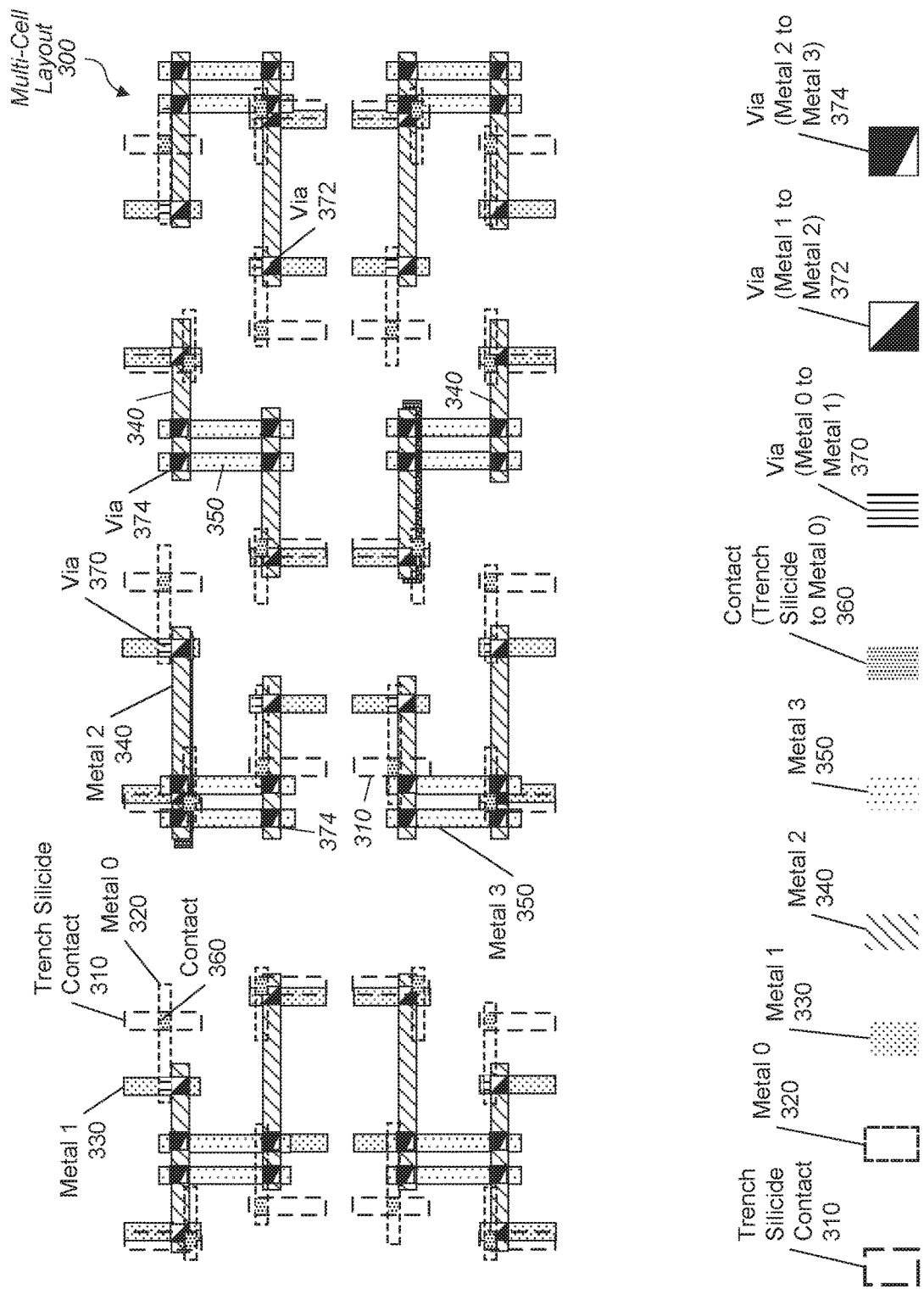
FIG. 3 is a generalized diagram of a top view of power grid connections for a standard cell layout for a complex logic gate.

Referring to FIG. 3, a generalized block diagram of a top view of a multi-cell layout 300 is shown. Multiple standard cells of varying type are used to create an array and the layout 300 is the layout of the resulting array connected to a power grid. Here, the active regions and metal gates are not shown in the multi-cell layout 300 for ease of illustration. In addition, the contacts between metal gates and horizontal metal zero are not shown as well as signal routes are not shown in the multi-cell layout 300 for ease of illustration. The vertical metal 1 being shown and elements below metal 1 (e.g., metal 0, trench silicide contact, etc.) are part of a corresponding standard cell.

The multi-cell layout 300 uses trench silicide contacts 310 for the source and drain regions in the vertical direction, metal 0 (M0 or Metal0) 320 for local interconnections in the horizontal direction, contacts 360 for connecting the trench silicide contact 310 to Metal0 320, metal 1 (M1 or Metal1) 330 for interconnections in the vertical direction, and vias 370 for connecting Metal0 320 to Metal1 330.

In addition, the multi-cell layout 300 uses metal 2 (M2 or Metal2) 340 for interconnections in the horizontal direction and vias 372 for connecting Metal1 330 to Metal2 340. Further, the multi-cell layout 300 uses metal 3 (M3 or Metal3) 350 for interconnections in the vertical direction, and vias 374 for connecting Metal2 340 to Metal3 350. As shown, the top-most row of Metal2 340 is used for connecting power (VDD) from a partial first standard cell which is flipped upside down or mirrored. The second row of Metal2 340 is used for connecting power of a different second standard cell which is not flipped upside down. The third row of Metal2 340 is used for connecting ground (GND or VSS) for the same second standard cell which is not flipped upside down. The fourth row of Metal2 340 is used for ground connections for a partial third standard cell layout which is flipped upside down or mirrored.

The multi-cell layout 300 does not use Metal0 320 power rails, and therefore, avoids electromigration (EM) issues at Metal0 320. Connections to power and ground are routed from Metal3 350 to via 374 to Metal2 340 to via 372 to Metal1 330 to via 370 to Metal0 320 to contact 360 to the trench silicide contact 310 which is within a corresponding standard cell. Power and ground connections at Metal0 320 are not shared. The multi-cell layout 300 uses independent power posts in each of the vertical Metal1 330 and the vertical Metal3 350 in addition to independent power straps in the horizontal Metal0 320 and the horizontal Metal2 340. A power post in a given metal layer is referred to as an independent power post when the power post is not connected to another of the multiple power posts in the given metal layer. Therefore, there are no power rails used in the given metal layer.

In one embodiment, one or more of the independent power posts in the vertical Metal3 350 has a length less than a height of a standard cell. In an embodiment, one or more of the independent power posts in the vertical Metal3 350 has a length based on a pitch of the independent power straps in the horizontal Metal2 340. As shown, each of the independent power posts in each of the vertical Metal1 330 and the vertical Metal3 350 in addition to each of the independent power straps in the horizontal Metal0 320 and the horizontal Metal2 340 are routed with unidirectional routes. Signal routes with no bends and no L-shapes are referred to as unidirectional routes. In contrast, signal routes with bends and/or L-shapes are referred to as bidirectional routes. Bidirectional routes create a significant on-die area penalty.

Figure 4:
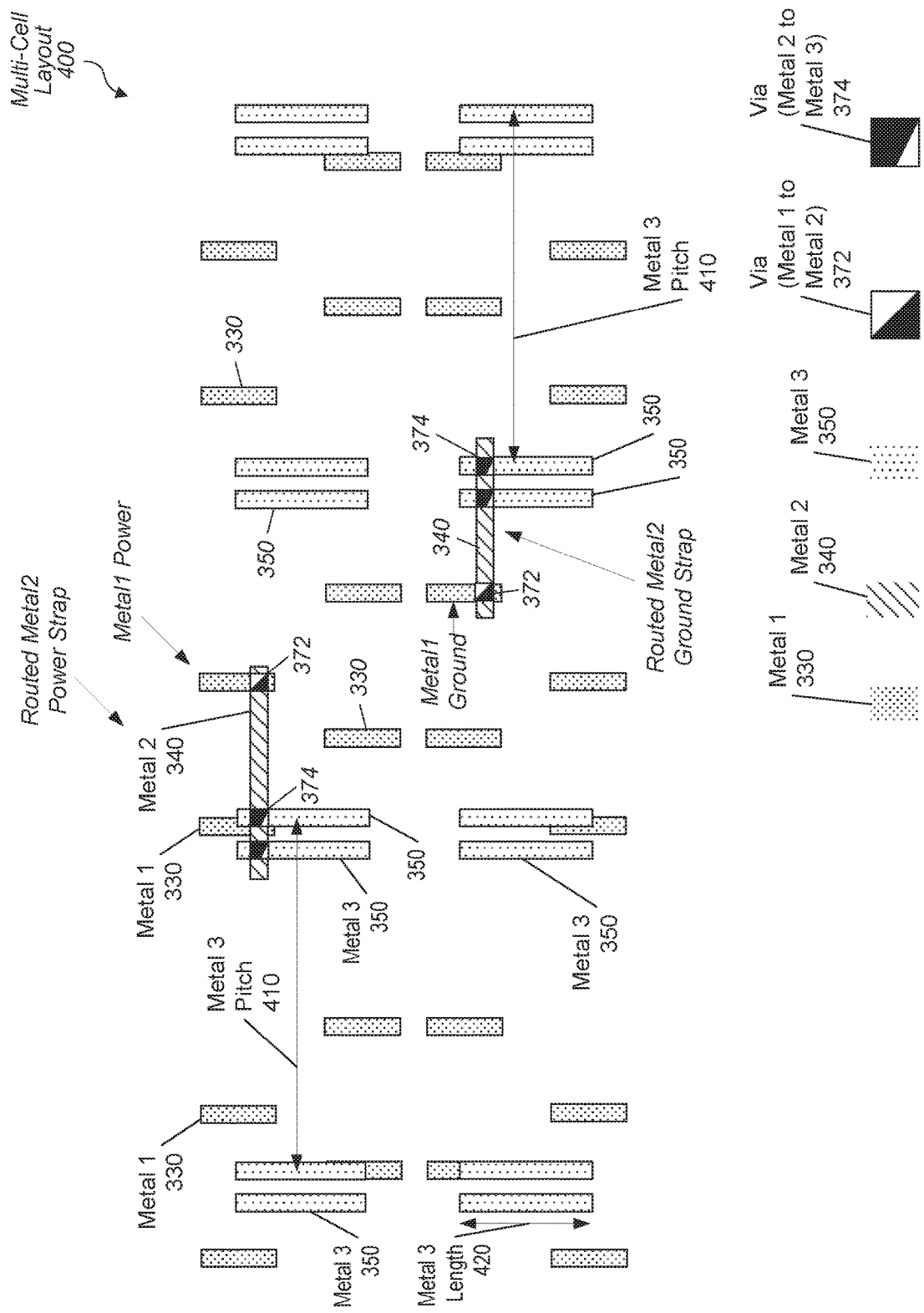
FIG. 4 is a generalized diagram of another top view of power grid connections for a standard cell layout for a complex logic gate.

Turning now to FIG. 4, a generalized block diagram of another top view of a multi-cell layout 400 is shown. Layout elements described earlier are numbered identically. Here, the multi-cell layout 400 is the same as the multi-cell layout 300, but only Metal1 330, Metal2 340, Metal3 350 and corresponding vias are shown for ease of illustration. In fact, only two routes are shown for Metal2 340. One route is for a power connection and another route is for a ground connection. The multi-cell layout 400 demonstrates one embodiment for connecting power and ground in an array.

As shown, power and ground connections are made before routing signals. Each Metal1 330 power connection is routed to the nearest Metal3 350 post using Metal2 340. As shown, the top Metal2 340 power strap connects a Metal1 330 power route to the nearest Metal3 350 post. Similarly, each Metal1 330 ground connection is routed to the nearest Metal3 350 post using Metal2 340. The bottom Metal2 340 ground strap shown in FIG. 4 connects a Metal1 330 ground route to the nearest Metal3 350 post.

In the illustrated embodiment, the Metal3 350 has a pitch 410 indicating how close to place a pair of vertical Metal3 350 posts relative to another pair of vertical Metal3 350 posts where the Metal3 350 posts are used for power and ground connections. The pitch 410 is also referred to as a grid 410. The pitch 410 is set by designers using a variety of factors such as one or more of an operating voltage, an operating frequency, a limit of an amount of current per Metal3 350 post and via 374, and so on. As shown, each Metal3 350 post for power and ground has a length 420, which is a minimum length. In some embodiments, the length of any Metal2 340 power or ground strap does not exceed half of the width of the pitch 410 in order to limit the lengths of Metal2 340 to relatively short metal layer lengths. In other embodiments, another fraction other than a half of the width of the pitch 410 is selected for the limit of any Metal2 340 power or ground strap.

The relatively short lengths of each of the Metal1 330, Metal2 340 and Metal3 350 for the power and ground connections allows these metal layers to handle higher currents than metal layers with relatively long lengths. The relatively short lengths of the metal layers 330, 340 and 350 used for power and ground connections provides higher reliability than metal layers with relatively long lengths. The relatively short lengths of the metal layers 330, 340 and 350 also provides Blech length relief for these metal layers. Additionally, the relatively short vertical Metal3 350 posts consume less tracks than an approach using outboard shared power rails.

Further, the relatively short lengths of each of the Metal1 330, Metal2 340 and Metal3 350 provide gaps for signal routes to use these metal layers which can alleviate or completely remove signal routing congestion. The relatively short lengths of the metal layers used for power and ground connections provide routing channels or tracks. Therefore, the router of a place-and-route tool has increased flexibility when performing signal routing after the power and ground connections are completed with the relatively short metal lengths.

Figure 5:
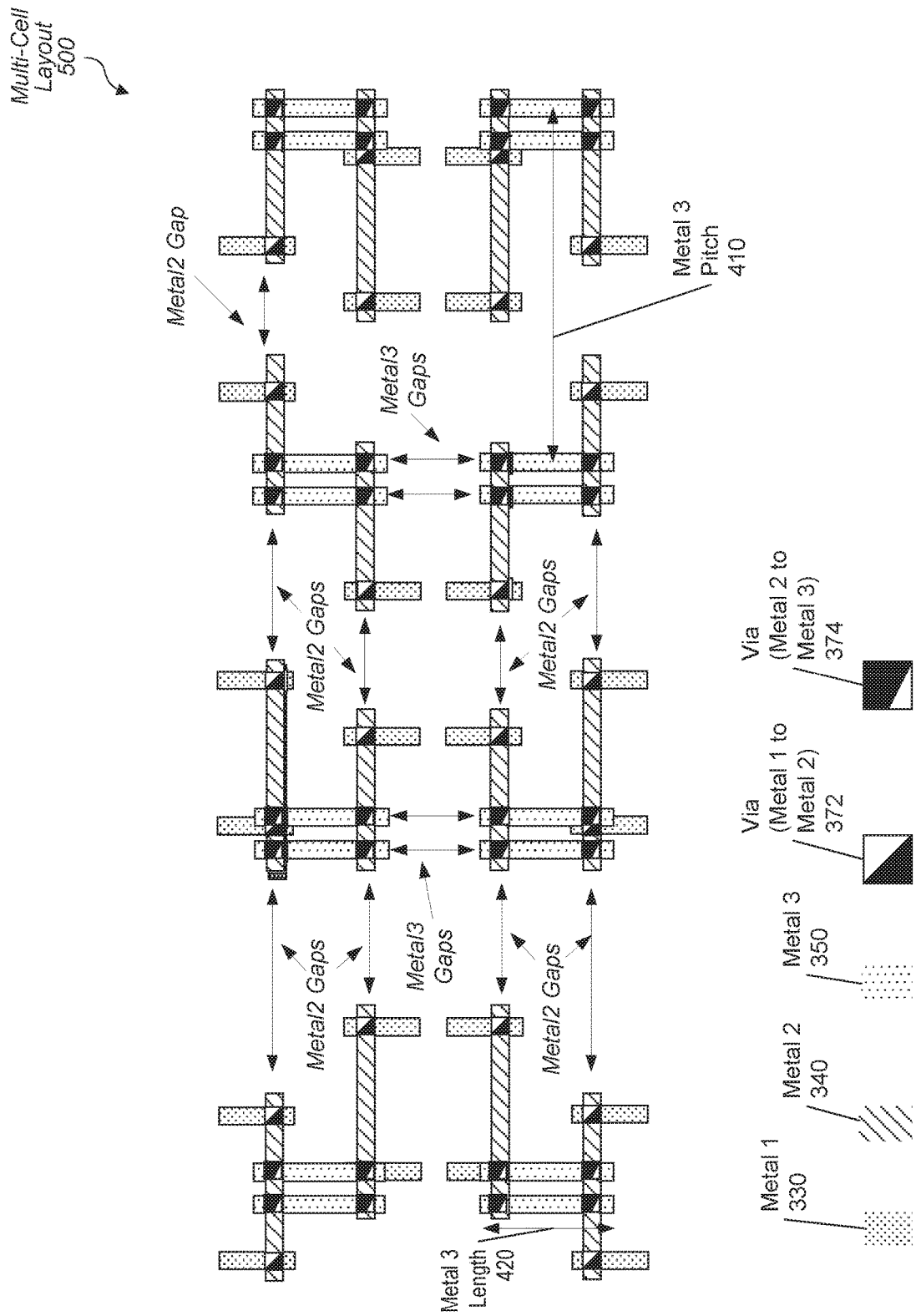
FIG. 5 is a generalized diagram of another top view of power grid connections for a standard cell layout for a complex logic gate.

Referring to FIG. 5, a generalized block diagram of another top view of a multi-cell layout 500 is shown. Layout elements described earlier are numbered identically. Here, the layout 500 is the same as the layouts 300 and 400. The multi-cell layout 500 demonstrates one embodiment for connecting power and ground in an array. Layout 500 only shows only Metal1 330, Metal2 340, Metal3 350 and corresponding vias for ease of illustration. The layout 500 uses the power and ground connections from layout 400 in addition to power and ground connections for other power and ground Metal1 330 stubs or posts.

As described earlier, power and ground connections are made before routing signals and each Metal1 330 power connection is routed to the nearest Metal3 350 post using Metal2 340. Similarly, each Metal1 330 ground connection is routed to the nearest Metal3 350 post using Metal2 340. The length of any Metal2 340 power or ground strap does not exceed a given fraction of the pitch 410, such as half of the pitch 410, in order to limit the lengths of Metal2 340 to relatively short metal layer lengths. The relatively short lengths of the metal layers 330, 340 and 350 also provides Blech length relief for these metal layers and provide gaps for signal routes to use these metal layers which can alleviate or completely remove signal routing congestion. Multiple examples of the gaps for Metal2 340 and Metal3 350 are shown in the layout 500. Since the power and ground pins are inboard Metal1 330 posts, rather than using outboard rails, the place-and-route tool is able to move standard cells under Metal2 340 and Metal3 350 versus having a fixed location for the standard cells.

Figure 6:
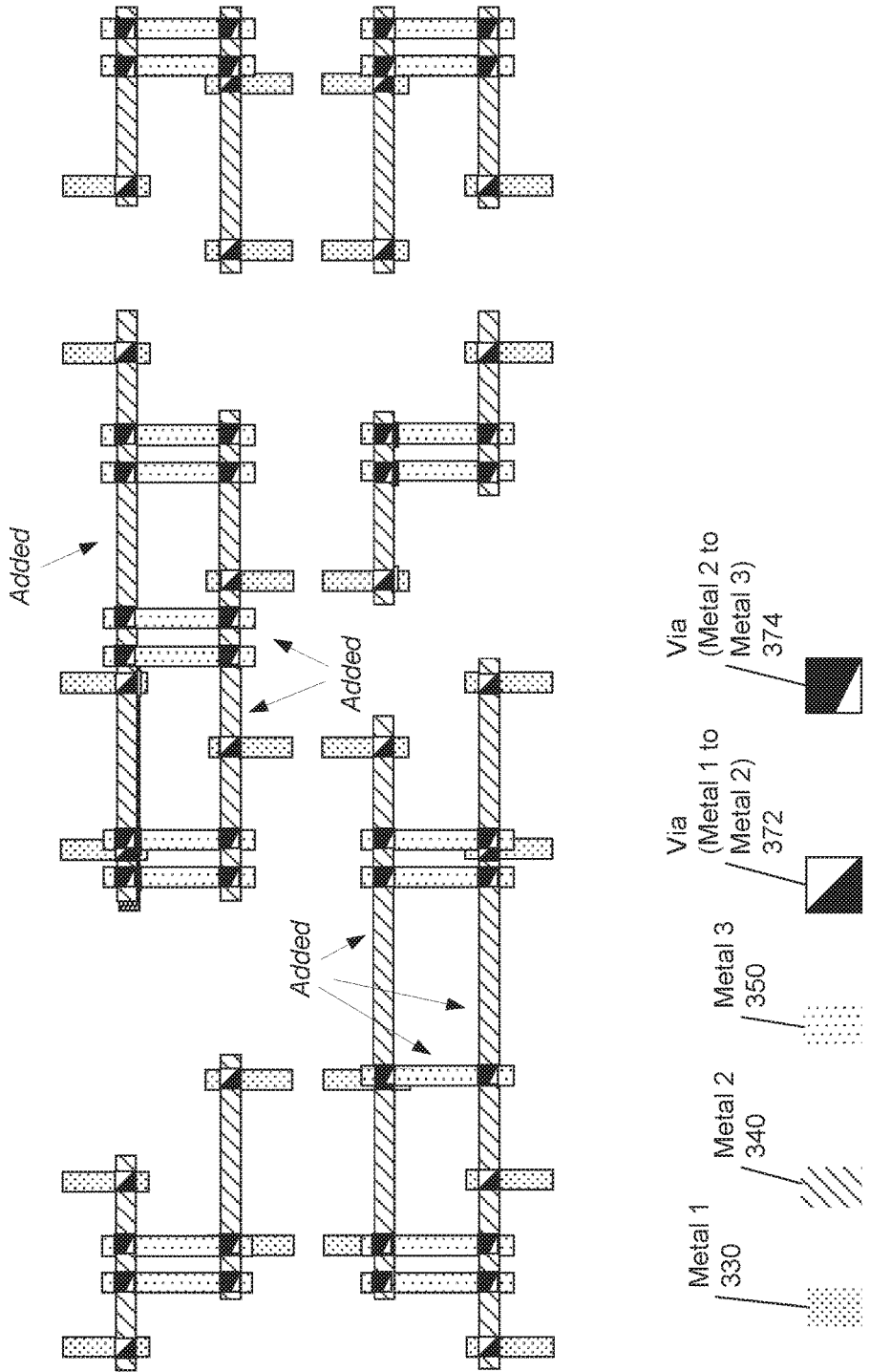
FIG. 6 is a generalized diagram of another top view of power grid connections for a standard cell layout for a complex logic gate.

Turning now to FIG. 6, a generalized block diagram of another top view of a multi-cell layout 600 is shown. Layout elements described earlier are numbered identically. The multi-cell layout 600 is the same as the multi-cell layouts 300, 400 and 500, but layout 600 has extra routing in gaps to reduce electromigration (EM) issues and voltage droop (IR drop) issues. In various embodiments, after the place-and-route tool completes or nearly completes the routing for power and ground connections, or at the end of routing signals, the place-and-route tool adds extra metal layers in order to increase reliability where areas for potential electromigration issues are found.

Figure 7:
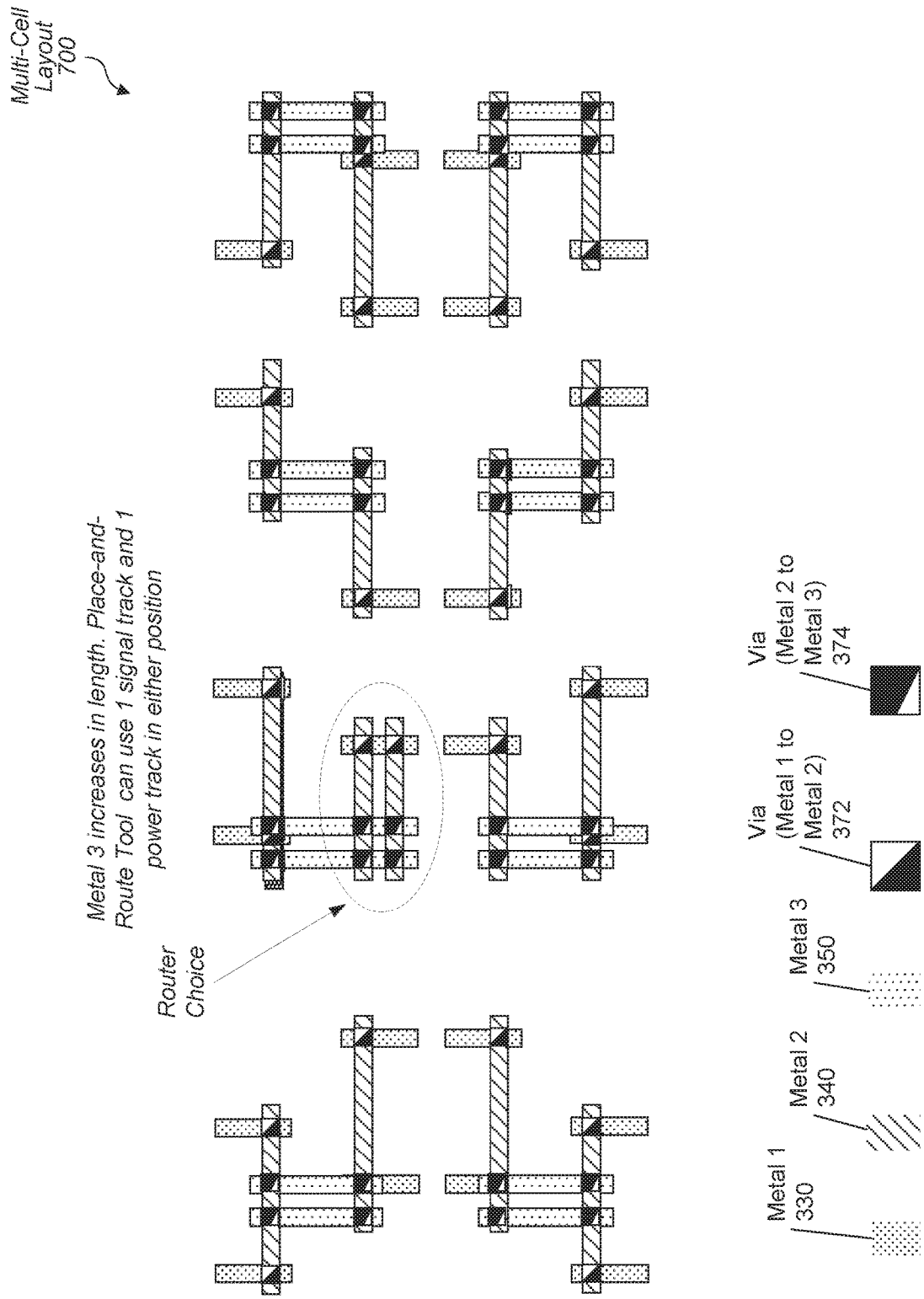
FIG. 7 is a generalized diagram of another top view of power grid connections for a standard cell layout for a complex logic gate.

Turning now to FIG. 7, a generalized block diagram of another top view of a multi-cell layout 700 is shown. Layout elements described earlier are numbered identically. The multi-cell layout 700 is the same as the multi-cell layouts 300, 400 and 500, but layout 700 highlights a router choice. The power Metal3 350 posts are increased in length to allow for two Metal2 340 tracks to be used. The place-and-route tool has an option of using a signal track alongside either above or below the power track. The signal track would not have vias 374 on the Metal3 350 posts used for the power connection. If the signal track is above the power track, then the power Metal3 350 posts are increased in length. In some embodiments, the Metal2 340 tracks are created first and then they are moved if it is determined it is better. Alternatively, the Metal2 340 tracks are added as routing is done. In some embodiments, one of the two Metal2 340 tracks is removed by the place-and-route tool when routing is completing. The extra length of the power Metal3 350 posts provides further routing flexibility for the place-and-route tool. Similarly, the same concept can be used for ground Metal3 350 posts.

Figure 8:
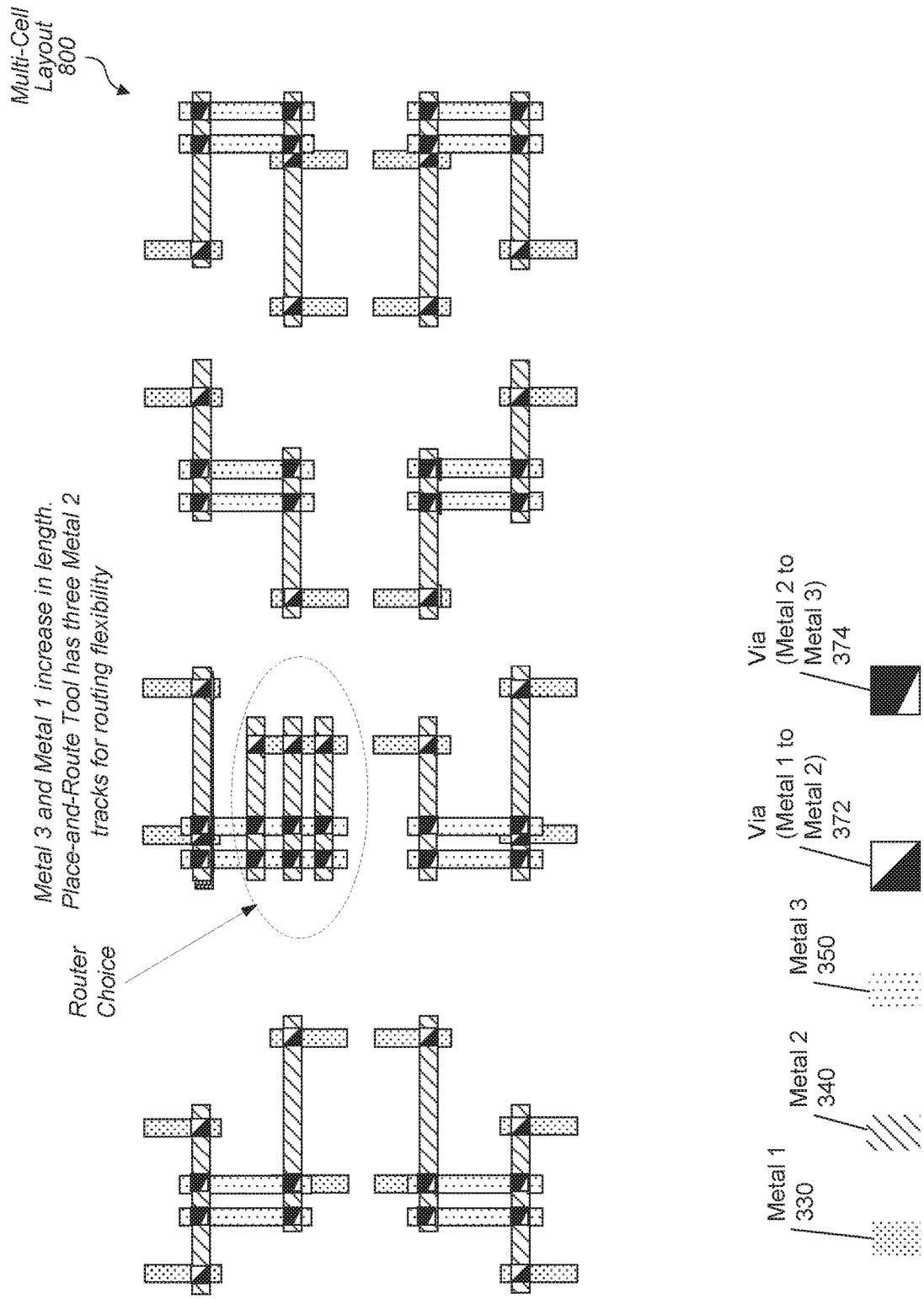
FIG. 8 is a generalized diagram of another top view of power grid connections for a standard cell layout for a complex logic gate.

Turning now to FIG. 8, a generalized block diagram of another top view of a multi-cell layout 800 is shown. Layout elements described earlier are numbered identically. The multi-cell layout 800 is the same as the multi-cell layout 700, but layout 800 highlights a different router choice. The power Metal3 350 posts are increased in length and the power Metal1 330 post is also increased in length to allow for three Metal2 340 tracks to be used. The place-and-route tool has an option of using a signal track alongside either above or below the power track. A signal track would not have vias 374 on the Metal3 350 posts used for the power connection. Design rules for voltage (IR) drop and timing are verified prior to increasing the length of the power Metal1 330 post.

Therefore, the place-and-route tool places the Metal3 350 power and ground posts followed by placing the Metal1 330 power and ground posts for the standard cells. Afterward, during signal routing, the place-and-route tool at times wants a track already occupied by a power or ground connection. With the flexibility offered by the techniques illustrated in the layout 700 and 800, the place-and-route tool can bump up or down the power and ground connections in order to use a particular previously occupied track for a given signal route. Although three tracks are shown in the layout 800, in other embodiments, another number of tracks greater than three is possible and contemplated for becoming available and adding flexibility for the place-and-route tool. Similarly, the same concept can be used for ground Metal3 350 posts.

Figure 9:
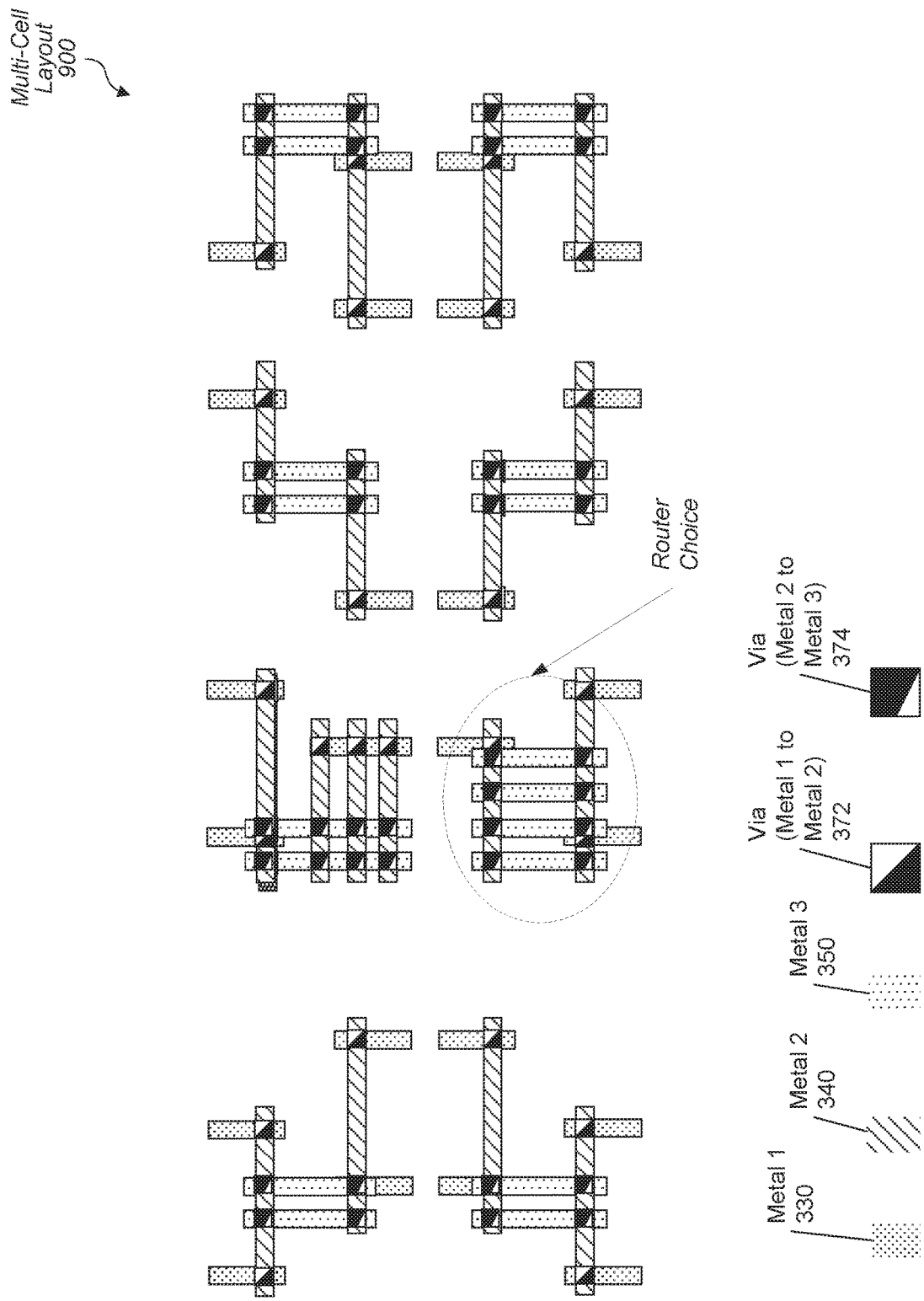
FIG. 9 is a generalized diagram of another top view of power grid connections for a standard cell layout for a complex logic gate.

Referring to FIG. 9, a generalized block diagram of another top view of a multi-cell layout 900 is shown. Layout elements described earlier are numbered identically. The multi-cell layout 900 is the same as the multi-cell layout 800, but layout 900 highlights a different router choice. An extra pair of ground Metal3 350 posts are placed on the ground Metal2 340 tracks. The place-and-route tool has an option of placing a ground connection or signal routes on either pair of the two available pairs shown.

The power grid architecture using techniques shown in layouts 300-900 and described above remove cell placement restrictions under power rails, reduce the wire routing used for power grids and reduce the number of tracks used for the power grid, provide increased routing efficiency and pin access, provide smaller routed designs, reduce electromigration (EM) risk and hots spots by taking advantage of the provided Blech length based wire relief and the allowed post route fixes, and allow for power grid nudging which provides tracks in particular locations for signal routing. Therefore, the power grid architecture using techniques shown in layouts 300-900 and described above avoid pitch defined fixed location power and ground vertical posts and horizontal straps, avoid relatively long wires in the metal zero through metal three layers, avoid using outboard shared power rails, and avoid standard cell placement restrictions due to blockages of metal one and metal two layers. As the use of extreme ultraviolet lithography (EUV) technique and other lithography techniques reduce the width and pitch used in standard cells to 5 nanometers and below, the above power grid architecture techniques provide the benefits listed above and reduce the issues listed above.

Figure 10:
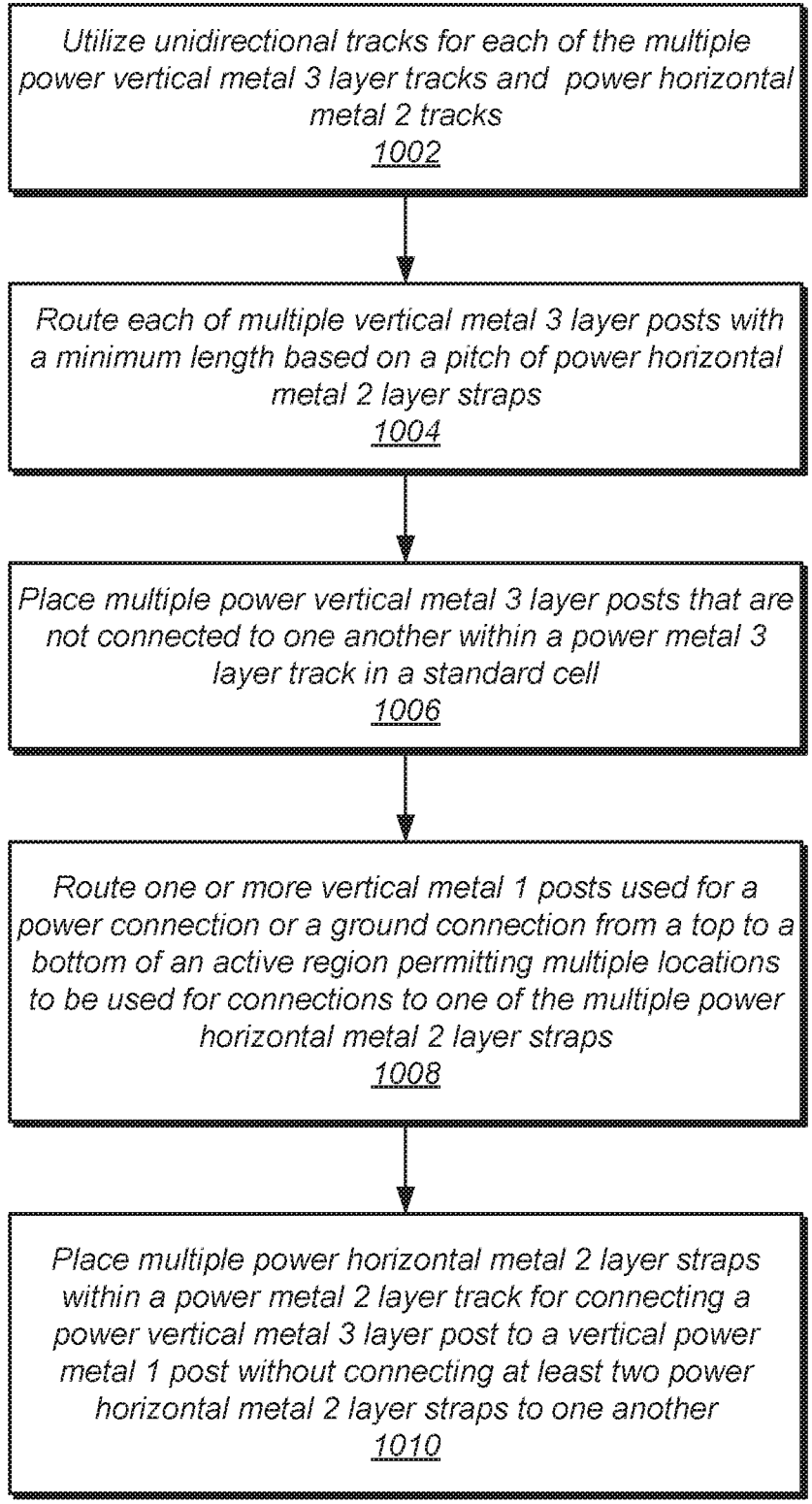
FIG. 10 is a generalized diagram of a method for laying out power grid connections for standard cells.

Referring now to FIG. 10, one embodiment of a method 1000 for creating layout power grid connections for standard cells is shown. For purposes of discussion, the steps in this embodiment are shown in sequential order. However, in other embodiments some steps occur in a different order than shown, some steps are performed concurrently, some steps are combined with other steps, and some steps are absent.

Unidirectional tracks are utilized for each of the multiple power vertical metal 3 layer tracks and power horizontal metal 2 tracks (block 1002). Metal layer tracks and accordingly the routes within the tracks with no bends and no L-shapes are referred to as unidirectional tracks and unidirectional routes. Metal layer tracks and accordingly the routes within the tracks with bends and/or L-shapes are referred to as bidirectional tracks and bidirectional routes. Bidirectional routes create a significant on-die area penalty.

Each of the multiple vertical metal 3 layer posts are routed with a minimum length based on a pitch of power horizontal metal 2 layer straps (block 1004). Multiple power vertical metal 3 layer posts that are not connected to one another are placed within a power metal 3 layer track in the standard cell (block 1006). Therefore, gaps are created in the vertical metal 3 tracks, which are available for signal metal 3 routes.

One or more vertical metal 1 posts used for a power connection or a ground connection are routed from a top to a bottom of an active region permitting multiple locations to be used for connections to one of the multiple power horizontal metal 2 layer straps (block 1008). The multiple locations provide flexibility for place-and-route algorithms for the standard cell. Multiple power horizontal metal 2 layer straps are placed within a power metal 2 layer track for connecting a power vertical metal 3 layer post to a vertical power metal 1 post without connecting at least two power horizontal metal 2 layer straps to one another (block 1010). Therefore, gaps are created in the horizontal metal 2 tracks, which are available for signal metal 2 routes. Similar to the gaps created in the vertical direction, these gaps alleviate any signal routing congestion in the standard cell.

It is noted that one or more of the above-described embodiments include software. In such embodiments, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various embodiments, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An integrated circuit with one or more standard cells comprising:

a first plurality of independent, unidirectional power posts being disconnected from one another in a first metal layer, with two or more of the first plurality of independent power posts within a standard cell of one or more standard cells:
  being routed in a direction substantially parallel with metal gates of transistors within the standard cell;
  having at least one end not routed to a boundary edge of the standard cell; and
  provides a power connection to a transistor within a standard cell of the one or more standard cells;
a second plurality of independent, unidirectional power posts being disconnected from one another in a second metal layer different from and above the first metal layer, with two or more of the second plurality of independent power posts:
  being routed in a direction substantially parallel with metal gates of transistors;
  has a length less than a height of the standard cell, the height being a dimension of the standard cell in a direction substantially parallel with metal gates of transistors;
a plurality of independent, unidirectional power straps being disconnected from one another in a third metal layer different from each of the first metal layer and the second metal layer, with two or more of the plurality of independent power straps:
  having at least one end not routed to a boundary edge of the standard cell; and
  connecting one of the first plurality of independent power posts to one of the second plurality of independent power posts; and
wherein at least one power post or one power strap of the two or more of the first plurality of independent power posts, of the two or more of the second plurality of independent power posts, and of the two or more of the plurality of independent power straps has no power connection between itself and another power post or power strap in any metal layer at or below the third metal layer.

2. The integrated circuit as recited in claim 1, wherein one or more of the plurality of independent power straps is routed with a length less than half of a width of a pitch indicating a distance between two pairs of power posts of the second plurality of independent power posts.

3. The integrated circuit as recited in claim 1, wherein a length of one or more of the second plurality of independent power posts is a minimum length based on a pitch of the plurality of independent power straps.

4. The integrated circuit as recited in claim 1, wherein a length of one or more of the independent power posts and straps provides Blech length relief for a corresponding metal layer.

5. The integrated circuit as recited in claim 1, wherein the first metal layer is a metal one layer routed substantially parallel with metal gates of transistors, the second metal layer is a metal three layer above the metal one layer and a metal two layer, and the third metal layer is the metal two layer between the metal one layer and the metal three layer routed substantially in a direction substantially perpendicular to metal gates of transistors.

6. The integrated circuit as recited in claim 5, further comprising one or more of a plurality of independent power straps in a metal zero layer below the metal one layer:
  routed in a direction substantially perpendicular to metal gates of transistors; and
  connected to vias of only a trench silicide contact used for a source or drain connection and one of the first plurality of independent power posts.

7. The integrated circuit as recited in claim 1, wherein one or more of the first plurality of independent power posts is routed no further than between a top to a bottom of an active region of a transistor.

8. The integrated circuit as recited in claim 1, wherein a gap exists in each track of a given metal layer that includes a power post or power strap providing additional non-power signal routing of the given metal layer in the gap.

9. The integrated circuit as recited in claim 1, wherein the power connection to the transistor is one of a power supply connection and a ground reference connection.

10. A method comprising:
  forming a plurality of non-planar metal gates in an integrated circuit comprising one or more standard cells;
  forming a plurality of trench silicide contacts placed in a direction substantially parallel with the plurality of non-planar metal gates in the integrated circuit;
  placing a first plurality of independent, unidirectional power posts being disconnected from one another in a first metal layer of at least one standard cell of the one or more standard cells of the integrated circuit, with two or more of the first plurality of independent power posts:
    having a route in a direction substantially parallel with metal gates of transistors;
    having a route with at least one end not routed to a boundary edge of the standard cell; and
    provides a power connection to a transistor within a standard cell;
  placing a second plurality of independent, unidirectional power posts being disconnected from one another in a second metal layer different from and above the first metal layer of the at least one standard cell of the one or more standard cells of the integrated circuit, with two or more of the second plurality of independent power posts:
    being routed in a direction substantially parallel with metal gates of transistors;
    having a length less than a height of the standard cell, the height being a dimension of the standard cell in a direction substantially parallel with metal gates of transistors; and
  placing a plurality of independent, unidirectional power straps being disconnected from one another in a third metal layer different from each of the first metal layer and the second metal layer of the at least one standard cell of the one or more standard cells of the integrated circuit, with two or more of the plurality of independent power straps:
    having at least one end not routed to a boundary edge of the standard cell; and
    connecting one of the first plurality of independent power posts to one of the second plurality of independent power posts; and
  wherein at least one power post or one power strap of the two or more of the first plurality of independent power posts, of the two or more of the second plurality of independent power posts, and of the two or more of the plurality of independent power straps has no power connection between itself and another power post or power strap in any metal layer at or below the third metal layer.

11. The method as recited in claim 10, further comprising placing one or more of the plurality of independent power straps with a length less than half of a width of a pitch indicating a distance between two pairs of power posts of the second plurality of independent power posts.

12. The method as recited in claim 10, further comprising routing one or more of the second plurality of independent power posts with a length that is a minimum length based on a pitch of the plurality of independent power straps.

13. The method as recited in claim 10, further comprising placing one or more of the independent power posts and straps with a length that provides Blech length relief for a corresponding metal layer.

14. The method as recited in claim 10, wherein the first metal layer is a metal one layer routed substantially parallel with metal gates of transistors, the second metal layer is a metal three layer above the metal one layer and a metal two layer, and the third metal layer is the metal two layer between the metal one layer and the metal three layer routed substantially in a direction substantially perpendicular to metal gates of transistors.

15. A semiconductor fabrication process for fabricating an integrated circuit with one or more standard cells, the semiconductor fabrication process comprising:
   forming within the one or more standard cells using an extreme ultraviolet (EUV) lithography technique:
      a plurality of non-planar metal gates; and
      a plurality of trench silicide contacts placed in a direction substantially parallel with the plurality of non-planar metal gates; and
   placing a first plurality of independent, unidirectional power posts being disconnected from one another in a first metal layer, with two or more of the first plurality of independent power posts within a standard cell of one or more standard cells:
      is routed in a direction substantially parallel with the plurality of non-planar metal gates within the standard cell;
      is a route with at least one end not routed to a boundary edge of the standard cell; and
      provides a power connection to a transistor within the standard cell;
   placing a second plurality of independent, unidirectional power posts being disconnected from one another in a second metal layer different from and above the first metal layer, with two or more of the second plurality of independent power posts:
      being routed in a direction substantially parallel with the plurality of non-planar metal gates;
      having a length of a route less than a height of the standard cell, the height being a dimension of the standard cell in a direction substantially parallel with metal gates of transistors; and
   placing a plurality of independent, unidirectional power straps being disconnected from one another in a third metal layer different from each of the first metal layer and the second metal, with two or more of the plurality of independent power straps:
      having at least one end not routed to a boundary edge of the standard cell; and
      connecting one of the first plurality of independent power posts to one of the second plurality of independent power posts; and
   wherein at least one power post or one power strap of the two or more of the first plurality of independent power posts, of the two or more of the second plurality of independent power posts, and of the two or more of the plurality of independent power straps has no power connection between itself and another power post or power strap in any metal layer at or below the third metal layer.

16. The semiconductor fabrication process as recited in claim 15, further comprising routing one or more of the plurality of independent power straps with a length less than half of a width of a pitch indicating a distance between two pairs of power posts of the second plurality of independent power posts.

17. The semiconductor fabrication process as recited in claim 15, further comprising placing one or more of the second plurality of independent power posts with a length that is a minimum length based on a pitch of the plurality of independent power straps.

18. The semiconductor fabrication process as recited in claim 15, further comprising placing one or more of the independent power posts and straps with a length that provides Blech length relief for a corresponding metal layer.

19. The semiconductor fabrication process as recited in claim 15, wherein the first metal layer is a metal one layer routed substantially parallel with metal gates of transistors, the second metal layer is a metal three layer above the metal one layer and a metal two layer, and the third metal layer is the metal two layer between the metal one layer and the metal three layer routed substantially in a direction substantially perpendicular to metal gates of transistors.

20. The semiconductor fabrication process as recited in claim 19, further comprising placing one or more of a plurality of independent power straps in a metal zero layer connected to vias of only a trench silicide contact used for a source or drain connection and one of the first plurality of independent power posts.

* * * * *